United States Patent Office 3,529,055
Patented Sept. 15, 1970

3,529,055
SUNTAN COMPOSITION AND METHOD CONTAINING ALKALI SOLUBLE POLYMERIC SUN SCREENING AGENTS
Martin Skoultchi, Somerset, and Joseph Fertig, Elizabeth, N.J., and Albert I. Goldberg, Englefield Green, England, assignors to National Starch and Chemical Corporation, New York, N.Y., a corporation of Delaware
No Drawing. Filed Mar. 18, 1966, Ser. No. 535,352
Int. Cl. A61k 9/06; A61l 23/00
U.S. Cl. 424—47                       6 Claims

ABSTRACT OF THE DISCLOSURE

Suntan formulations containing polymeric sun screen agents comprising copolymers of at least one ethylenically unsaturated ultra-violet absorbing compound and at least one acidic comonomer comprising an ethylenically unsaturated carboxylic acid containing at least one available carboxyl group; the presence of these polymeric sun screen agents providing these suntan formulations with unusual solubility characteristics along with excellent sun screening properties.

---

This invention relates to the preparation of improved formulations for the prevention of sunburn and, more particularly, to the novel formulations thus prepared.

Sunburn, or erythema as it is identified by the medical profession, results from the excessive exposure of human skin to either the rays of the sun or to sun lamps which produce ultra-violet radiation similar to natural sunlight. In order to prevent entirely or substantially reduce sunburn while nonetheless promoting the development of a suntan, various so called "suntan" formulations are available which are adapted to be applied over the body areas which are to be exposed. These formulations all generally contain a so-called "sun screen" agent whose primary function is to absorb those wavelengths of light in the range of from about 280–320 millimicrons which cause sunburn while transmitting those wavelengths in the range of from about 320–350 millimicrons which produce a desirable suntan.

In addition to the above noted primary sun screening function, a suitable sun screen agent should, desirably, be essentially insoluble in fresh or salt water while being completely removable from the skin upon washing with soap and water. It should, moreover, be fully compatible with water and organic solvents as well as with the various ingredients which may be present in the suntan preparation such, for example, as oils, perfumes, pigments and aerosol propellants. Finally, the sun screen agent should be fully resistant to any breakdown resulting from its exposure to ultra-violet radiation and, needless to say, it should be entirely harmless to the user.

Among the various chemical compounds which have been utilized as sun screen agents for suntan formulations, one may mention ethyl p-aminobenzoate, propyl p-aminobenzoate, glyceryl p-aminobenzoate, isobutyl p-aminobenzoate, ethyl p-glucosylimidobenzoate, 2-ethoxyethyl p-methoxycinnamate and various alkyl and aryl substituted cinnamate. All of these prior art sun screen agents may thus be readily characterized as relatively low molecular weight, non-polymeric, organic compounds.

Although such compounds provide generally efficient results in suntan formulations with regard to fulfilling their primary function of absorbing the ultra-violet radiation which causes harmful sunburn while transmitting those wavelengths which result in a suntan, they are however, often deficient in many other respects. Thus, of considerable concern is the fact that many of the presently available sun screen agents are often quickly removed upon coming into contact with eithr fresh or salt water, thereby necessitating the application of additional quantities of the suntan formulation if protection from the sun's rays is still desired. On the other hand, if the sun screen agents are sufficiently water insoluble, they may prove to be extremely difficult for the user to remove from his body.

It is therefore, the prime object of this invention to provide suntan formulations including sun screen agents, said sun screen agents being characterized by the fact that they are essentially insoluble in fresh and salt water being readily removable by the application of soap and water.

Various other objects and advantages of this invention will be apparent upon a reading of the disclosure which follows hereinafter.

We have discovered that suntan formulations containing sun screen agents capable of screening harmful ultra-violet radiation and transmitting the beneficial rays and which are, moreover, essentially insoluble in both fresh and salt water while being readily removable by the application of soap and water may be readily prepared by the use therein, as sun screen agents, of the novel class of materials described as follows: copolymers containing moieties derived from a union of 1 and 2, (1) at least one comonomer which is an ethylenically unsaturated derivative of a compound capable of absorbing the ultra-violet radiation which causes sunburn, while nonetheless transmitting ultra-violet radiation which produces a suntan; and (2) at least one acidic comonomer comprising an ethylenically unsaturated carboxylic acid containing at least one available carboxyl group.

Thus, the above described sun screen agents may be briefly characterized as copolymers resulting from the polymerization of at least one ultra-violet absorbing comonomer together with at least one acidic comonomer. The use of these polymeric sun screen agents in the novel suntan formulations of this invention has been found to result in substantial advantages as compared with the use, in comparable formulations, of conventional low molecular weight, non-polymeric sun screen agents.

There is, first, their outstanding resistance to removal by either salt or fresh water. However, the presence of the moieties derived from the acidic comonomer makes it possible for these sun screen agents to be completely and quickly removed merely upon the application of a mildly alkaline aqueous solution, e.g. soap and water, in showering or bathing. This is made possible by a reaction between the soap and the available carboxyl groups of the moieties derived from the acidic comonomer; the latter reaction serving to convert the hitherto water insoluble copolymer into the form of a readily soluble alkaline salt which offers no resistance to its being washed from the body of the user.

In addition to the above described advantages of our alkali soluble, polymeric suntan formulations in their unusual solubility characteristics, they are also superior to the conventional formulations based on low molecular weight, nonpolymeric sun screen agents in that they display outstanding film forming properties. These excellent film forming properties are a direct result of the polymeric nature of these sun screen agents and greatly contribute to their overall ease of application as well as to the high degree of retentivity, subsequent to application.

It may, moreover, be noted that these sun screen agents are compatible with the various types of additives whose presence may be desired by the practitioner, and are, of course, fully resistant to any alterations in their chemical structure upon exposure to ultra-violet radiation.

With respect to the ethylenically unsaturated derivatives of compounds capable of absorbing ultra-violet radiation responsible for sunburn and transmitting ultra-violet radiation which promotes tanning and which are, therefore, capable of being utilized as the ultra-violet absorbing co-monomers in the preparation of the copolymers which comprise the novel alkali soluble, polymeric sun screen agents of this invention, the following groups of monomeric material may be listed:

(A) The ethylenically unsaturated derivatives of phenyl salicylate, described in U.S. Pat. 3,141,903 which are prepared by means of the reaction between an acrylyl or methacrylyl halide with phenyl 2,5-dihydroxy benzoate;

(B) The ethylenically unsaturated derivatives of 2,4-dihydroxybenzophenone, described in U.S. Pat. 3,162,676 which are prepared by means of the reaction between glycidyl acrylate or methacrylate with either 2,4-dihydroxybenzophenone; 2,2',4-trihydroxybenzophenone; or, 2,2',4,4'-tetrahydroxybenzophenone;

(C) The ethylenically unsaturated derivatives of 2,4-dihydroxybenzophenone, described in U.S. Pat. 3,202,716 which are prepared by means of the reaction between allyl glycidyl ether or butadiene monoxide with either 2,4-dihydroxybenzophenone; 2,2',4-trihydroxybenzophenone; or 2,2',4,4'-tetrahydroxybenzophenone;

(D) The ethylenically unsaturated derivatives of ortho-dihydric phenols, described in U.S. Pat. 3,156,720 which are prepared by means of the reaction between an ortho-dihydric phenol and either glycidyl acrylate or methacrylate;

(E) The ethylenically unsaturated derivatives of ortho-hydroxy aromatic acids, described in U.S. Pat. 3,167,583 which are prepared by means of the reaction between an orthohydroxy aromatic acid and either glycidyl acrylate or methacrylate;

(F) The ethylenically unsaturated benzophenone derivatives, described in British Pat. 885,986 which are prepared by means of the reaction between acrylyl or methacrylyl chloride and 2,4-dihydroxybenzophenone; examples of these light-stabilizing compounds including 2-hydroxy - 4 - methacryloxybenzophenone, 2 - hydroxy - 4 - acryloxybenzophenone, 2 - hydroxy - 2' - methacryloxybenzophenone, 2 - hydroxy - 4 - methacryloxy - 5 - tertiary butylbenzophenone, 2 - hydroxy 2' methacryloxy-4,4' - dimethoxybenzophenone, 2 - hydroxy - 4 - methacryloxy-2',4'-dichlorobenzophenone.

In general, the method for preparing such benzophenone derivatives corresponds to the following technique:

A mixture of 10.0 grams of 2,4-dihydroxybenzophenone and 5.0 grams of methacrylyl chloride was treated with 20 ml. of anhydrous pyridine with stirring. After 15 minutes the resultant mixture was heated in a water bath at 70° C. to 80° C. for 15 minutes. The reactor was then cooled and the contents were poured into 600 ml. of 3% aqueous hydrochloric acid containing 100 grams of crushed ice. As soon as possible the aqueous mixture was extracted with ether, the ether phase was dried over anhydrous sodium sulfate, and the ether was removed in a vacuum oven at 40° C. to 50° C. The resultant product was recrystallized from ethanol containing 15% water, yielding 11.1 grams of pale yellow crystals having a melting point of 76° C.;

(G) The ethylenically unsaturated amino substituted benzophenone derivatives, described in U.S. Pat. 3,120,564 which are prepared by means of the reaction between an amino and further substituted 2-hydroxybenzophenone with an alkenoyl halide;

(H) The ethylenically unsaturated benzotriazole derivatives, described in U.S. Pat. 3,072,585 which are prepared by means of the reaction between hydroxy substituted 2-hydroxyphenylbenzotriazoles with chloromethylstyrenes;

(I) The ortho substituted ethylenically unsaturated phenol derivatives, described in British Pat. 894,702, such as p-tertiary-butylphenyl methacrylate can be most conveniently prepared by reaction of the corresponding alpha, beta-unsaturated acid chloride, acrylyl and methacrylyl chloride, on a phenol, p-tertiary-butylphenol. The reactions proceed rapidly even at room temperature and the yields are generally high. The esterifications can also be accomplished by the use of acylating agents such as acrylic acid anhydride but these esterifications proceed more slowly at lower temperatures. At higher temperatures, acylations with the acid anhydrides proceed more rapidly but care must be taken to avoid premature rearrangement.

The ethylenically unsaturated portion of the ultraviolet light stabilizing precursor can comprise acrylic, methacrylic, ethacrylic and propylacrylic esters. The acrylic and methacrylic esters are preferred because they copolymerize more readily. The methacryl esters are especially preferred in that they do not, by virtue of their structure, introduce tertiary hydrogen atoms in the copolymer chain.

Various tertiary alkyl groups can be employed in the para-position of the phenyl nucleus to block the migration of the rearranging group from entering the para-position. Thus, such groups as tertiary-butyl, tertiary-amyl, tertiary-hexyl and tertiary-heptyl groups may be employed. The phenyl nucleus may also be substituted with other alkyl groups or halogen groups so long as they do not interfere with the rearrangement of the carboxylic ester to the ortho-hydroxy phenone structure.

In general, the method for preparing such derivatives corresponds to the following technique:

A solution of 25.0 grams (0.17 mole) of p-tertiary-butylphenol dissolved in 50 ml. of anhydrous pyridine was treated with 22.0 grams (0.21 mole) of methacrylyl chloride. The mixture was vigorously shaken and then heated on a water bath at 60° C.–70° C. for one hour under anhydrous conditions. A 100 ml. portion of ethyl ether was added to the mixture after it had been cooled and the resultant solution was extracted with cold water. The organic phase was stripped of ether and fractionally distilled. The fraction distilling at 120° C.–122° C. at a pressure of 0.4 mm. mercury was found to be the desired product;

(J) The ethylenically unsaturated benzophenone derivatives, described in U.S. Pat. 2,962,533 which are prepared by means of the selective alkenylation of either 2,4-dihydroxybenzophenone; 2,2',4 - trihydroxybenzophenone; or, 2,2',4,4' - tetrahydroxybenzophenone to replace the hydrogens on the para hydroxyls, but to leave the ortho hydroxyls untouched;

(K) The ethylenically unsaturated benzotriazole derivatives, prepared by the catalyzed reaction of a selected 2-(2-hydroxyphenyl) benzotriazole intermediate with an ethylenically unsaturated reagent selected from the group consisting of glycidyl acrylate, glycidyl methacrylate, allyl, glycidyl ether, and butadiene monoxide.

The 2-(2-hydroxyphenyl) benzotriazole compounds which are applicable for use as intermediates in preparing the ethylenically unsaturated benzotriazole derivatives include: 2-(2,3-dihydroxyphenyl) benzotriazole, 2-(2,4-dihydroxyphenyl) benzotriazole, 2-(2,5-dihydroxyphenyl) benzotriazole, 4 - hydroxy - 2 - (hydroxyphenyl) benzotriazole, 5 - hydroxy - 2 - (2 - hydroxyphenyl) benzotriazole, 2-(3-carboxy-2-hydroxyphenyl) benzotriazole, 2-(4-carboxy - 2 - hydroxyphenyl) benzotriazole, 2-(5-carboxy-2-hydroxyphenyl) benzotriazole, 4-carboxy-2-(2-hydroxyphenyl) benzotriazole, 5-carboxy-2-(2-hydroxyphenyl) benzotriazole. Moreover, the latter intermediates may, if desired, be further substituted upon either their phenyl or benzo rings with one or more of various substituent groups such, for example, as the halogeno, alkyl, or alkoxy groups.

In conducting the reaction which leads to the synthesis of these derivatives, the selected ethylenically unsaturated reagent, in an equimolar concentration or a concentration amounting to a slight stoichiometric excess in the order of about 10 to 20% over the subsequently added 2-(2-hydroxyphenyl) benzotriazole intermediate, is first ordinarily admixed with the selected catalyst. The latter may be chosen from among any member of the group consisting of the alkali metal hydroxides, such as sodium hydroxide or potassium hydroxide; the salts of alkali metals, such as sodium bicarbonate or sodium chloride; and, the quaternary ammonium halides, such as tetramethyl ammonium chloride or tetrabutyl ammonium iodide. These catalysts should be present in concentrations of about 0.1 to 5.0%, as based upon the weight of the ethylenically unsaturated reagent.

Following the initial preparation of the mixture comprising the catalyst and the ethylenically unsaturated reagent, the 2-(2-hydroxyphenyl) benzotriazole intermediate is thereupon added with continued agitation. Following the complete admixture of the 2-(2-hydroxyphenyl) benzotriazole intermediate with the catalyst and the ethylenically unsaturated reagent, agitation is continued while the resulting reaction mixture is maintained at a temperature in the range of about 50° to 100° C., and preferably at about 80° to 90° C., for periods of about 6 to 14 hours. Under these conditions, the reaction between the 2-(2-hydroxyphenyl) benzotriazole intermediate and the ethylenically unsaturated reagent will ordinarily proceed at a conversion in the range of about 80 to 95%.

In general, the preparation of these derivatives may be conducted at any temperature which will be high enough so as to result in an adequate reaction rate. However, inasmuch as some of these derivatives display very little tendency to homopolymerize, they may if desired be prepared at rather high temperatures without any danger of their spontaneous polymerization. In addition, the length of the reaction period will depend, for the most part, upon the specific ethylenically unsaturated reagent which is being utilized. Thus, it is a matter of ordinary preparative experience on the part of the practitioner to determine the precise combination of time and temperature which will be best suited for his synthesis of any of the 2-(2-hydroxyphenyl) benzotriazole derivatives.

Upon the completion of the reaction and with subsequent cooling of the reaction vessel to room temperature, the resulting products will ordinarily be in the form of either viscous oils or semi-solids. For most purposes, including any subsequent polymerization reactions, this crude ethylenically unsaturated 2 - (2 - hydroxyphenyl) benzotriazole derivative can then be used without any further purification being necessary. However, where desired, the relatively small amount of unreacted 2-(2-hydroxyphenyl) benzotriazole may be removed.

It is also possible to prepare these derivatives by reaction in an organic solvent medium. Under these conditions, the 2-(2-hydroxyphenyl) benzotriazole intermediate, the catalyst, and the ethylenically unsaturated reagent may all be dissolved in a non-reactive polar solvent such as acetone, methyl ethyl ketone, butyl acetate, tetrahydrofuran, dimethylformamide or dimethylsulfoxide. The resulting derivative would then be recovered by distilling off the solvent whereupon the crude product could, again, be purified by means of the above noted techniques.

(L) The ethylenically unsaturated derivatives of 2,4-dihydroxybenzophenone described in copending application Ser. No. 224,247, filed Sept. 17, 1962, now issued as U.S. Pat. 3,341,493, Sept. 12, 1967, and assigned to the assignee of the subject application which are prepared by means of the reaction between 2,4-dihydroxybenzophenone and a glycidyl ester of an ethylenically unsaturated carboxylic acid containing at least 4 carbon atoms;

(M) The ethylenically unsaturated derivatives of 2,4-dihydroxybenzophenone described in copending application Ser. No. 226,464, filed Sept. 26, 1962, now issued as U.S. Pat. 3,317,462, May 2, 1967, and assigned to the assignee of the subject application which are prepared by means of the reaction between 2-hydroxy-4-methoxy-5-chloromethylbenzophenone with an alkali metal salt of acrylic or methacrylic acid;

(N) The ethylenically unsaturated derivatives of phenyl salicylate prepared by the reaction, in an organic solvent medium and in the presence of an acid acceptor, of an allyl halide with phenyl salicylate. The latter reaction yields phenyl 2-allyloxy benzoate. By heating the latter product it may then, if desired, be rearranged by means of a Claisen type rearrangement so as to yield the ultra-violet absorbing phenyl 2-hydroxy-3-allyl benzoate. Thus, it is seen that the 2-allyloxy ether of phenyl benzoate represents, in effect, the intermediate to be used for the subsequent preparation of the more valuable phenyl 2-hydroxy-3-allyl benzoate.

The organic solvent which is utilized for the synthesis of the phenyl 2-allyloxy benzoate should be a solvent which is non-reactive under the conditions of the reaction and which should, furthermore, be polar in character. Among the suitable solvents which may be mentioned are acetone, methyl ethyl ketone, dioxane, tetrahydrofuran and dimethyl formamide. As for the allyl halide, one may use either allyl chloride or allyl bromide, with the latter being preferred inasmuch as it is a more reactive reagent than the chloride. The acid acceptor for the system should comprise a reagent which is capable of effectively combining with the hydrogen chloride or hydrogen bromide which evolved as a by-product of the reaction. One may thus employ alkali metal carbonates or bicarbonates, such as sodium or potassium carbonate or bicarbonate, or a tertiary amine, such as pyridine or triethyl amine.

With respect to proportions, the allyl halide should be present in about a 3 to 8% molar excess over the phenyl salicylate while the acid acceptor should be used in a concentration which, on a molar basis, corresponds to the concentration of the phenyl salicylate. In conducting the reaction, the allyl halide is ordinarily the last reagent which is introduced into the system which, while under agitation, is then heated to reflux and maintained at that level for a period of from about 4 to 10 hours. The resulting reaction product is then diluted with water whereupon it is extracted with an organic solvent such as ethyl ether or methylene chloride. The solvent layer derived from the latter extraction is first washed with aqueous alkali and then with water and finally dried over a drying agent such as anhydrous potassium carbonate. The last step involves removing the residual extraction solvent by distillation at a temperature of about 40 to 50° C. By means of this procedure, phenyl 2-allyloxy benzoate is produced in yields of about 80 to 90% of the theoretical.

In effecting the Claisen rearrangement of phenyl 2-allyloxy benzoate to phenyl 2-hydroxy-3-allyl benzoate, it is necessary to heat the former, for about 30–90 minutes, at a temperature in the range of about 200 to 250° C. Preferably, this heating operation should be conducted in an inert atmosphere so as to avoid the excessive formation of colored by-products and, for this purpose, it is convenient to flush the apparatus with nitrogen gas prior to the initiation of heating. For most purposes, including its use in any subsequent polymerizations, the resulting crude phenyl 2-hydroxy-3-allyl benzoate can then be used without any further purification being necessary. However, where desired, the relatively small amount of by-products which are formed may be removed by dissolving the reaction mass in methylene chloride, first washing the resulting solvent layer with aqueous alkali and then with water, drying over a drying agent, filtering the organic layer through activated charcoal and finally removing the methylene chloride by warming the solution under reduced pressure.

It should also be noted that analogous monomeric allyloxy and allyl derivatives may also be prepared by using various substituted phenyl salicylates as the starting intermediate for the reaction with the allyl halide. Thus, by utilizing phenyl 2,4-dihydroxy benzoate, one may first obtain phenyl 2-hydroxy-4-allyloxy benzoate which may then be rearranged so as yield a mixture of phenyl, 2,4-dihydroxy-3-allyl benzoate and phenyl 2,4-dihydroxy-5-allyl benzoate. Or, by starting with phenyl 2,5-dihydroxy benzoate, one would first obtain phenyl 2-hydroxy-5-allyloxy benzoate and then, on rearrangement, a mixture of phenyl 2,5-dihydroxy-4-allyl benzoate and phenyl 2,5-dihydroxy-6-allyl benzoate. Similarly, by employing phenyl 2-hydroxy-3-methyl benzoate, one would first obtain phenyl 2-allyloxy-3-methyl benzoate and, on rearrangement, phenyl 2-hydroxy-3-methyl-5-allyl benzoate. Moreover, one may also utilize, as a starting intermediate, a phenyl salicylate derivative wherein the molecule may be substituted, as for example, with one or more alkyl, aryl, alkoxy or halogeno radicals;

(O) The ortho-substituted ethylenically unsaturated phenol derivatives, described in copending application Ser. No. 282,593, filed May 23, 1963, now issued as U.S. Pat. 3,290,270, Dec. 6, 1966 and assigned to the assignee of the subject application, which are prepared by the reaction of an ortho-substituted halomethyl salicylic acid with an alkali metal salt of acrylic or methacrylic acid.

The patents and applications listed are to be considered fully incorporated herein.

It is to be noted that all of the above groups of ethylenically unsaturated ultra-violet absorbing compounds fall into one of the following broad catagories:

(1) ethylenically unsaturated derivatives of phenyl salicylate;
(2) ethylenically unsaturated derivatives of benzophenone;
(3) ethylenically unsaturated derivatives of phenols wherein the ethylenic unsaturation is substituted ortho to the phenolic hydroxyl group; and
(4) ethylenically unsaturated derivatives of benzotriazole.

In addition to the information which is presented in the experimental examples, further details relating to detailed preparation of the specific compounds encompassed by the above listed groupings may be obtained by reference to the various cited patents. Needless to say, these groups of compounds are to be considered as being merely illustrative inasmuch as any other ethylenically unsaturated derivatives of compounds capable of absorbing ultra-violet radiation are similarly applicable for use as co-monomers in preparing our novel polymeric sun screen agents.

As for the acidic comonomers comprising ethylenically unsaturated carboxylic acids containing at least one free carboxyl group which are required in the preparation of our alkali soluble, polymeric sun screen agents, the following list of monomers may be taken as representative thereof: acrylic acid; methacrylic acid; itaconic acid; crotonic acid; and, the $C_1$–$C_4$ alkyl half esters of maleic and fumaric acids such, for example as methyl hydrogen maleate and butyl hydrogen fumarate, as well as any other acidic monomers which will be uniformly copolymerized with the particular ultra-violet absorbing comonomer whose use is desired by the practitioner.

In addition to the presence of at least one ultra-violet absorbing comonomer and at least one acidic comonomer, the copolymers comprising the novel polymeric sun screen agents of this invention may also contain one or more optional comonomers whose presence may be desired by the practitioner for any particular purpose such, for example, as controlling the solubility and film forming characteristics or reducing the overall cost of the resulting copolymer. Illustrative of such optional comonomers are: styrene; alphamethyl styrene; the acrylic and methacrylic acid esters of aliphatic alcohols such as methyl, ethyl, propyl, butyl, isobutyl, amyl, hexyl, 2-ethylhexyl, octyl, lauryl, and stearyl alcohols; the $C_1$–$C_2$ beta-hydroxyalkyl esters of acrylic and methacrylic acids; isoprene; butadiene; acrylamide; acrylonitrile; vinyl formate; vinyl acetate; vinyl chloride; vinylidene chloride; vinyl propionate; dibutyl maleate; dibutyl fumarate; ethylene; propyl- and N-vinyl pyrrolidone, etc.

In order to provide copolymers which will function efficiently as sun screen agents in the novel suntan formulations of this invention, it is necessary that the copolymer contain from about 5–90%, by weight, of moieties derived from at least one of the above described ethylenically unsaturated ultra-violet absorbing compounds and from about 5–50%, by weight, of moieties derived from at least one of the above described acidic comonomers. The moieties derived from the optional comonomers may thus be present in the copolymer in a range of from zero up to about 90%, by weight.

As for the actual preparation of the polymeric sun screen agents, there may be employed any of the usual polymerization methods which are well known to those skilled in the art and which is particularly suited for the polymer whose preparation is desired. Thus, they may be prepared by means of a free radical initiated process utilizing bulk, suspension, solution, or emulsion polymerization techniques.

In any event, the novel polymeric sun screen agents of this invention, whether prepared by means of bulk, suspension, solution or emulsion polymerization techniques, or by other means, are all characterized by:

(1) their ability to absorb the ultraviolet wave lengths which cause sunburn while transmitting those wavelengths which promote tanning and
(2) their essential insolubility in both fresh and salt water coupled with their ready solubility in soap, i.e. dilute alkali, solutions.

In incorporating these polymeric sun screen agents into suntan formulations, a variety of procedures may be employed depending upon the type of suntan formulation which is desired by the practitioner. Thus, for example, it is possible to prepare such formulations in the form of organic solvent solutions, aqueous emulsions, solid gels, or in so called "aerosol" formulations which are dispensed, under pressure, as a spray by means of a propellant, usually halogenated hydrocarbon. For overall convenience, however, it has been found desirable to prepare the polymeric sun screen agent initially in the form of a solution lacquer in an organic solvent such, for example, as isopropanol. Such lacquers may then be directly utilized, upon the addition of various optional ingredients, or they may be readily converted into any of the other above noted physical forms.

Of the various optional ingredients which may be included in our suntan formulations, the more significant additives are oils, fats, waxes, emulsifiers, surfactants, silicone fluids, perfumes, preservatives, pigments, and dyes, etc., as well as any other class of materials whose presence may be desired by the practitioner.

It may be noted that the suntan formulations of this invention will, in all cases, contain two essential components. The first of the latter components will be what may be termed as the active ingredient comprising one or more of our novel alkali soluble, polymeric sun screen agents which will be admixed dispersed or dissolved, together with the various optional ingredients, in the second component of the system comprising a vehicle such, for example, as water, an organic solvent, an oil, a fat or any combination of one or more of the latter vehicles.

With respect to proportions, it is only necessary that these novel suntan formulations contain at least about 1.0%, by weight, of one of our polymeric sun screen agents, which, as previously noted, should contain at least about 5%, by weight of moieties derived from an ethylenically unsaturated ultraviolet absorbing compound and at least 5%, by weight, of moieties derived from an acidic comonomer. The maximum concentration of the polymeric sun screen agent will, of course, be dependent upon economic considerations as well as the degree of sun screening which is desired.

An interesting modification of our suntan formulations comprises the use, therein, of a polymeric sun screen agent containing moieties derived from both an ethylenically unsaturated phenyl salicylate compound and an ethylenically unsaturated benzophenone derivative.

Such sun screen agents will, in addition to absorbing the burning rays of the sun, absorb essentially all ultraviolet radiation thereby providing a maximum degree of protection to the user who is not concerned with the development of a suntan. Formulations containing such sun screen agents would, therefore, be particularly useful for farmers, construction workers, soldiers, athletes, and photographers models, etc. who must spend long hours exposed to sunlight.

The following examples, in which all parts are by weight, will further illustrate the embodiment of this invention.

EXAMPLE I

This example illustrates the preparation of a typical suntan formulation of this invention containing one of our novel polymeric sun screen agents. In this case, the formulation was prepared in the form of an isopropanol based lacquer.

The particular polymeric sun screen agent utilized in this formulation was a 50:40:10 2 - hydroxy - 3 - (2 - hydroxybenzoyloxy) propyl methacrylate:beta-hydroxypropyl acrylate:acrylic acid terpolymer which was insoluble in water and completely soluble in soap solution and which had been prepared in the form of an isopropanol lacquer, containing about 50% by weight of resin solids, by means of the solution polymerization procedure described in Example II of U.S. Pat. 3,180,851. The ethylenically unsaturated ultra-violet absorbing compound, i.e. the 2-hydroxy-3-(2-hydroxybenzoyloxy) propyl methacrylate, utilized in the preparation of the latter terpolymer may be briefly described as an ethylenically unsaturated, ultraviolet absorbing ortho substituted phenol derivative. It was synthesized by means of the procedure described in Example III of U.S. Pat. 3,167,583, which involved the reaction of glycidyl methacrylate with salicylic acid.

The preparation of the suntan formulation based on this sun screen agent was completed by first diluting the initial polymer lacquer with anhydrous ethanol whereupon the various optional ingredients were introduced. Thus, its final composition was as follows:

| | Parts by weight |
|---|---|
| 50%, by weight, isopropanol solution of the above described terpolymer | 1.4 |
| Anhydrous ethanol | 23.6 |
| Isopropyl myristate | 3.0 |
| Phenylmethylpolysiloxane | 1.0 |
| Glycerin | 1.0 |
| Perfume | Trace |

In using the suntan formulation, it was found that after having been applied to the user's body, it was not removed after bathing in either fresh or salt water but that it was, on the other hand, readily washed off by the application of soap and water. The use of this formulation provided full protection against sunburn while nonetheless permitting the user to develop an excellent suntan.

In a repetition of the procedure, a comparable suntan formulation was prepared which in this case contained a polymeric sun screen agent comprising a 50:40:10 2-hydroxy-3-(2-hydroxyphenoxy) propyl acrylate:beta-hydroxyethyl acrylate:methacrylic acid terpolymer which was prepared in the form of an isopropanol lacquer, containing about 50% by weight of resin solids, by means of the solution polymerization procedure described in Example II of U.S. Pat. 3,180,851. The ethylenically unsaturated ultraviolet absorbing compound, i.e. the 2-hydroxy-3-(2-hydroxyphenoxy) propyl acrylate, utilized in the preparation of the latter terpolymer may be briefly described as an ethylenically unsaturated, ultra-violet absorbing ortho substituted phenol derivative. It was synthesized by means of the procedure described in Example I of U.S. Pat. 3,156,720, which involved the reaction of glycidyl acrylate with ortho-dihydroxybenzene.

EXAMPLE II

This example illustrates the preparation of a typical suntan formulation of this invention containing another of our novel polymeric sun screen agents. In this case, the formulation was prepared in the form of a so called aerosol.

The particular polymeric sun screen agent utilized in this formulation was an 80:5:15 ethyl acrylate:phenyl-2-hydroxy - 5 - methacrylyloxymethyl benzoate:methacrylic acid terpolymer which was prepared, in the form of an isopropanol lacquer containing 50% by weight of resin solids, by means of the solution polymerization procedure described in Example VI of U.S. Pat. 3,186,968.

The ethylenically unsaturated ultra-violet absorbing compound, i.e. the phenyl 2-hydroxy-5-methacrylyloxymethyl benzoate, utilized in the preparation of the latter terpolymer may be briefly described as an ethylenically unsaturated, ultraviolet absorbing phenyl salicylate derivative. It was synthesized by means of the procedure described in Example VI of U.S. Pat. 3,141,903, which involved the reaction of phenyl 2-hydroxy-5-chloromethyl benzoate with sodium methacrylate.

The preparation of the aerosol suntan formulation based on this polymeric sun screen agent was completed by first diluting the initial terpolymer lacquer with anhydrous ethanol and admixing the perfume with the resulting solution whereupon the propellant was introduced and the container sealed. Thus, its final composition was as follows:

| | Parts by weight |
|---|---|
| 50%, by weight, isopropanol solution of the above described terpolymer | 2.63 |
| Anhydrous ethanol | 44.25 |
| 60:40 mixture of trichlorofluoromethane and dichlorodifluoromethane (propellant) | 53.12 |
| Perfume | Trace |

In actual use, the above described aerosol suntan formulation was found to exhibit the same solubility characteristics and ultra-violet absorbing properties as were demonstrated by the formulation whose preparation was described in Example I.

In a repetition of the procedure, a comparable suntan formulation was prepared which in this case contained a polymeric sun screen agent comprising an 80:10:10 butyl acrylate:phenyl 2-hydroxy-5-acrylyloxymethyl benzoate:itaconic acid terpolymer which was prepared in the form of an isopropanol lacquer, containing about 50% by weight of resin solids, by means of the solution polymerization procedure described in Example VI of U.S. Pat. 3,186,968. The ethylenically unsaturated ultra-violet absorbing compound, i.e. the phenyl 2-hydroxy-5-acrylyloxymethyl benzoate, utilized in the preparation of the latter terpolymer may be briefly described as an ethylenically unsaturated, ultra-violet absorbing phenyl salicylate derivative. It was synthesized by means of the procedure described in Example V of U.S. Pat 3,141,903, which involved the reaction of phenyl 2-hydroxy-5-chloromethyl benzoate with sodium acrylate.

EXAMPLE III

This example illustrates the preparation of a typical suntan formulation of this invention containing one of our novel polymeric sun screen agents. In this case, the formulation was prepared in the form of an aqueous emulsion of the oil-in-water type.

The particular polymeric sun screen agent utilized in this formulation was a 70:30 4-methacryloxy betahydroxypropyl ether of 2,4-dihydroxybenzophenone:methacrylic acid copolymer which was prepared in the form of an isopropanol lacquer, containing about 50% by weight of resin solids by means of the solution polymerization procedure described in Example III of U.S. Pat. 3,173,893.

The ethylenically unsaturated ultra-violet absorbing compound, i.e. the 4-methacryloxy beta-hydroxypropyl ether of 2,4-dihydroxybenzophenone, utilized in the preparation of the latter copolymer may be briefly described as an ethylenically unsaturated ultra-violet absorbing benzophenone derivative. It was synthesized by means of the procedure described in Example II of U.S. Pat. 3,162,676, which involved the reaction of glycidyl methacrylate with 2,4-dihydroxybenzophenone.

The preparation of the aqueous emulsion suntan formulation based on this polymeric sun screen agent was completed by first admixing all of the various optional ingredients with the copolymer lacquer whereupon the water was introduced and, upon the application of high speed mechanical agitation, the desired oil-in-water emulsion was obtained. Thus, its final composition was as follows:

| | Parts by weight |
|---|---|
| 50%, by weight, isopropanol solution of the above described copolymer | 3.5 |
| Acetylated lanolin | 5.0 |
| Stearic acid | 2.0 |
| Beeswax | 10.0 |
| Mineral oil | 50.0 |
| Water and alcohol soluble lanolin derivative | 5.0 |
| Butylated hydroxy anisole (preservative) | 0.2 |
| 28%, by weight, aqueous ammonia | 0.6 |
| Water | 32.0 |
| Perfume | Trace |

In actual use, the above described suntan formulation was found to exhibit the same solubility characteristics and ultra-violet absorbing properties as were demonstrated by the formulation whose preparation was described in Example I.

In a repetition of the procedure, a comparable suntan formulation was prepared which in this case contained a polymeric sun screen agent comprising a 95:5 acrylic acid:4-methacryloxy beta-hydroxypropyl ether of 2,2',4-trihydroxybenzophenone copolymer which was prepared in the form of an isopropanol lacquer, containing about 50% by weight of resin solids, by means of the solution polymerization procedure described in Example III of U.S. Pat. 3,173,893. The ethylenically unsaturated ultra-violet absorbing compound, i.e. the 4-methacryloxy beta-hydroxypropyl ether 2,2',4-trihydroxybenzophenone, utilized in the preparation of the latter copolymer may be briefly described as ethylenically unsaturated, ultra-violet absorbing benzophenone derivative. It was synthesized by means of the procedure described in Example III of U.S. Pat. 3,162,676, which involved the reaction of glycidyl methacrylate with 2,2',4-trihydroxybenzophenone.

EXAMPLE IV

This example illustrates the preparation of a typical suntan formulation of this invention containing one of our novel polymeric sun screen agents. In this case, the formulation was again prepared in the form of an isopropanol lacquer.

The particular polymeric sun screen agent utilized in this formulation was a 50:30:20 vinyl acetate:ethyl hydrogen maleate:4-(3-acryloxy-2-hydroxypropyl) ether of 2-(2,4-dihydroxyphenyl) benzotriazole terpolymer which was prepared in the form of an isopropanol lacquer containing about 50% by weight of resin solids, by means of the solution polymerization procedure wherein the above identified ingredients were charged into a reactor equipped with a reflux condenser as well as with means for mechanical agitation. Under agitation, the above mixture was then refluxed at 83° C. for a period of six hours whereupon it was allowed to cool and discharged from the reactor.

The ethylenically unsaturated ultra-violet absorbing compound, i.e. the 4-(3-acryloxy-2-hydroxypropyl) ether of 2-(2,4-dihydroxyphenyl) benzotriazole, utilized in the preparation of the latter terpolymer may be briefly described as an ethylenically unsaturated, ultra-violet absorbing benzotriazole derivative. It was synthesized by means of the procedure wherein an agitated mixture of 15.0 parts of glycidyl acrylate, 22.7 parts of 2-(2,4-dihydroxyphenyl) benzotriazole, and 0.4 part of tetramethylammonium chloride was heated to a temperature in the range of 85° C. and maintained at this temperature for a period of 12 hours. Upon being cooled to room temperature, the resulting reaction product partially solidified. The resulting material was crystallized from a methanol-water solution whereupon the 4-(3-acryloxy-2-hydroxypropyl) ether of 2-(2,4-dihydroxyphenyl) benzotriazole was recovered.

The preparation of the suntan formulation based on this polymeric sun screen agent was completed by first diluting the initial polymer lacquer with anhydrous ethanol whereupon the various optional ingredients were introduced. Thus, its final composition was as follows:

| | Parts by weight |
|---|---|
| 50%, by weight, isopropanol solution of the above described terpolymer | 1.4 |
| Anhydrous ethanol | 23.6 |
| Isopropyl myristate | 3.0 |
| Phenylmethylpolysiloxane | 1.0 |
| Glycerin | 1.0 |
| Perfume | 9.5 |

In actual use, the above described suntan formulation was found to exhibit the same solubility characteristics and ultra-violet absorbing properties as were demonstrated by the formulation described in Example I.

In the repetition of the above procedure, a comparable suntan formulation was prepared which in this case contained a polymeric sun screen agent comprising a 40:40:20 vinyl acetate:butyl hydrogen fumarate:3-(3-methacryloxy-2-hydroxypropyl) ether of 2-(2,3-dihydroxyphenyl) benzotriazole terpolymer which was prepared in the form of an isopropanol lacquer, containing about 50% by weight of resin solids, by means of the solution polymerization procedure wherein the above identified ingredients were charged into a reactor equipped with a reflux condenser as well as with means for mechanical agitation. Under agitation, the above mixture was then refluxed at 83° C. for a period of 6 hours whereupon it was allowed to cool and discharged from the reactor. The ethylenically unsaturated ultra-violet absorbing compound, i.e. the 3-(3-methacryloxy-2-hydroxypropyl) ether of 2-(2,3-dihydroxyphenyl) benzotriazole, utilized in the preparation of the latter terpolymer may be briefly described as an ethylenically unsaturated, ultra-violet absorbing benzotriazole derivative. It was synthesized by means of the procedure wherein an agitated mixture of 15.0 parts of glycidyl methacrylate, 22.7 parts of 2-(2,3-dihydroxyphenyl) benzotriazole, and 0.4 part of tetramethylammonium chloride was heated to a temperature in the range of 85° C. and maintained at this temperature for a period of 12 hours. Upon being cooled to room temperature, the resulting reaction product partially solidified. The resulting material was crystallized from a methanol-water solution whereupon the 3-(3-methacryloxy-2-hydroxypropyl) ether of 2-(2,3-dihydroxyphenyl) benzotriazole was recovered.

Summarizing, this invention is therefore seen to provide the practitioner with novel suntan formulations containing polymeric sun screen agents whose presence provides these formulations with unusual solubility characteristics along with excellent sun screening properties. Variations may be made in proportions, procedures and materials without departing from the scope of this invention as defined by the following claims.

This application also incorporates the subject matter of copending application, Ser. No. 535,340, filed of even date herewith by Martin Skoultchi and Frank Theodore Koehler, Jr., now issued as U.S. Pat. 3,445,566, May 20, 1969.

What is claimed is:

1. A suntan formulation in the form of an aerosol, an oil-in-water emulsion or an isopropyl alcohol based lacquer comprising:
   (1) at least 1.0%, by weight, of an alkali soluble, polymeric sun screen agent comprising a copolymer of
      (A) at least on ethylenically unsaturated ultraviolet absorbing compound selected from the group consisting of the ethylenically unsaturated derivatives of phenyl salicylate resulting from the reaction of phenyl salicylate with a reagent selected from the group consisting of the acrylyl, methacrylyl and allyl halide; the ethylenically unsaturated derivatives of benzophenone resulting from the reaction of a benzophenone intermediate selected from the group consisting of 2,4 - dihydroxybenzophenone, 2,2', 4-trihydroxybenzophenone and 2,2',4,4', - tetrahydroxybenzophenone with a reagent selected from the group consisting of glycidyl acrylate, glycidyl methacrylate, allyl glycidyl ether and butadiene monoxide; the ethylenically unsaturated derivatives of ortho-dihydric phenols resulting from the reaction of an ortho-dihydric phenol and a reagent selected from the group consisting of glycidyl acrylate and methacrylate; the ethylenically unsaturated derivatives of orthohydroxy aromatic acids resulting from the reaction of an ortho-hydroxy aromatic acid with a reagent selected from the group consisting of glycidyl acrylate and methacrylate; the ethylenically unsaturated derivatives of 2,4-dihydroxybenzophenone resulting from the reaction of 2,4-dihydroxybenzophenone with a reagent selected from the group consisting of acrylyl and methacrylyl chloride; the ethylenically unsaturated amino substituted benzophenone derivatives resulting from the reaction of an alkenoyl halide containing from 3 to 11 carbon atoms therein selected from the group consisting of alkenoyl chlorides and bromides with an amino substituted 2-hydroxybenzophenone; the ethylenically unsaturated benzotriazole derivatives resulting from the reaction of a chloromethylstyrene and a hydroxy substituted 2-hydroxyphenylbenzotriazole; the ortho substituted ethylenically unsaturated phenol derivatives resulting from the reaction of an alpha, beta-ethylenically unsaturated acid chloride selected from the group consisting of acrylyl, methacrylyl, ethacrylyl and propylacrylyl chlorides and p-tertiary-butylphenol; and ethylenically unsaturated benzophenone derivatives resulting from the selective alkenylation, at elevated temperatures utilizing stoichiometrical concentrations, of a benzophenone intermediate selected from the group consisting of 2,4 - dihydroxybenzophenone, 2,2',4 - trihydroxybenzophenone and 2,2',4,4'-tetrahydroxybenzophenone wherein the resulting derivatives have the hydrogen atoms of their para-hydroxyl groups replaced with alkenyl groups; the ethylenically unsaturated derivatives of benzotriazole resulting from the reaction of 2 - (2,4 - dihydroxyphenyl) benzotriazole with a reagent selected from the group consisting of glycidyl acrylate, glycidyl methacrylate, allyl glycidyl ether and butadiene monoxide; the ethylenically unsaturated derivatives of 2,4 - dihydroxybenzophenone resulting from the reaction of 2,4 - dihydroxybenzophenone with a glycidyl ester of an ethylenically unsaturated carboxylic acid containing 4 to 8 carbon atoms; the ethylenically unsaturated derivatives of benzophenone resulting from the reaction of 2 - hydroxy - 4 - methoxy-5-chloromethylbenzophenone and an alkali metal salt of acid selected from the group consisting of acrylic and methacrylic acids; the ortho-substituted-ethylenically unsaturated phenol derivatives resulting from the reaction of an ortho-substituted halomethyl salicylic acid with an alkali metal salt of an acid selected from the group consisting of acrylic and methacrylic acids; and
      (B) at least one acidic comonomer comprising an ethylenically unsaturated carboxylic acid containing at least one available carboxyl group, said acidic comonomer being selected from the group consisting of acrylic, methacrylic, itaconic and crotonic acids and the $C_1$–$C_4$ alkyl half esters of an acid selected from the group consisting of maleic and fumaric acids; and
   (2) a maximum of 99%, by weight, of a cosmetically acceptable vehicle for said polymeric sun screen agent with which said sun screen agent is capable of being intimately admixed.

2. The suntan formulation of claim 1, wherein said alkali soluble, polymeric sun screen agent contains up to about 90%, by weight, of moieties from at least one comonomer other than those comprising the combination of at least on ethylenically unsaturated ultra-violet absorbing compound and at least one acidic comonomer, said other comonomer being selected from the group consisting of styrene, alpha-methyl styrene, the acrylic and methacrylic acid esters of aliphatic alcohols, the $C_1$–$C_2$ beta-hydroxy alkyl esters of acrylic and methacrylic acids, isoprene, butadiene, acrylamide, acrylonitrile, vinyl formate, vinyl acetate, vinyl chloride, vinylidene chloride, vinyl propionate, dibutyl maleate, dibutyl fumarate, ethylene, propylene and N-vinyl pyrrolidone.

3. The suntan formulation of claim 1, wherein said alkali soluble, polymeric sun screen agent contains from about 5–90%, by weight, of moieties derived from at least one ethylenically unsaturated ultra-violet absorbing compound of (A) and from about 5–50%, by weight, of moieties derived from at least one acidic comonomer of (B).

4. A method for the protection of the human body against painful burn which results from excessive exposure to ultraviolet radiation, said method comprising the application to the body to screen it from these wave lengths of light in the range of from about 280 to 320 millimicrons of a coating of a suntan formulation in the form of an aerosol, an oil-in-water emulsion or an isopropyl alcohol based lacquer comprising:
   (1) at least 1.0%, by weight, of an alkali soluble, polymeric sun screen agent comprising a copolymer of
      (A) at least one ethylenically unsaturated ultraviolet absorbing compound selected from the group consisting of the ethylenically unsaturated derivatives of phenyl salicylate resulting from the reaction of phenyl salicylate with a reagent selected from the group consisting of the acrylyl, methacrylyl and allyl halides; the ethylenically unsaturated derivatives of benzophenone resulting from the reaction of a benzophenone intermediate selected from the group, consisting of 2,4 - dihydroxybenzophenone, 2,2',4-trihydroxybenzophenone and 2,2',4,4' - tetrahydroxybenzophenone with a reagent selected from the group consisting of glycidyl acrylate, glycidyl methacrylate, allyl glycidyl ether and butadiene monoxide; the ethylenically unsaturated derivatives of ortho-dihydric phenols resulting from the reaction of an ortho-dihydric phenol and a reagent selected from the group consisting of glycidyl acrylate and methacrylate; the ethylenically unsaturated derivatives of ortho-hydroxy aromatic acids resulting from the reaction of an ortho-hydroxy aromatic acid with a reagent selected from the group consisting of glycidyl acrylate and methacrylate; the ethylenically unsaturated derivatives of 2,4 - dihydroxybenzophenone resulting from the reaction of 2,4-dihydroxybenzophenone with a reagent selected from the group consisting of acrylyl and methacrylyl chloride; the ethylenically unsaturated amino substituted benzophenone derivatives resulting from the reaction of an alkenoyl halide containing from 3 to 11 carbon atoms therein selected from the group consisting of alkenoyl chlorides and bromides with an amino substituted 2 - hydroxybenzophenone; the ethylenically unsaturated benzotriazole derivatives resulting from the reaction of a chloromethylstyrene and hydroxy substituted 2 - hydroxyphenylbenzotriazole; the ortho substituted ethylenically unsaturated phenol derivatives resulting from the reaction of an alpha,beta - ethylenically unsaturated acid chloride selected from the group consisting of acrylyl, methacrylyl, ethacrylyl, and propylacrylyl chlorides and p-tertiarybutylphenol; the ethylenically unsaturated benzophenone derivatives resulting from the selective alkenylation, at elevated temperatures utilizing stoichiometrical concentrations, of a benzophenone intermediate selected from the group consisting of 2,4 - dihydroxybenzophenone, 2,2',4 - trihydroxybenzophenone and 2,2',4,4' - tetrahydroxybenzophenone wherein the resulting derivatives have the hydrogen atoms of their para-hydroxyl groups replaced with alkenyl groups; the ethylenically unsaturated derivatives of benzotriazole resulting from the reaction of 2 - (2,4 - dihydroxyphenyl) benzotriazole with a reagent selected from the group consisting of glycidyl acrylate, glycidyl methacrylate, allyl glycidyl ether and butadiene monoxide; the ethylenically unsaturated derivatives of 2,4 - dihydroxybenzophenone resulting from the reaction of 2,4 - dihydroxybenzophenone with a glycidyl ester of an ethylenically unsaturated carboxylic acid containing 4 to 8 carbon atoms; the ethylenically unsaturated derivatives of benzophenone resulting from the reaction of 2 - hydroxy - 4 - methoxy-5-chloromethylbenzophenone and an alkali metal salt of an acid selected from the group consisting of acrylic and methacrylic acids; the ortho-substituted ethylenically unsaturated phenol derivatives resulting from the reaction of an ortho-substituted halomethyl salicylic acid with an alkali metal salt of acid selected from the group consisting of acrylic and methacrylic acids; and (B) at least one acidic comonomer comprising an ethylenically unsaturated carboxylic acid containing at least one available carboxyl group, said acidic comonomer being selected from the group consisting of acrylic, methacrylic, itaconic and crotonic acids and the $C_1$–$C_4$ alkyl half esters of an acid selected from the group consisting of maleic and fumaric acids; and (2) a maximum of 99%, by weight, of a cosmetically acceptable vehicle for said polymeric sun screen agent with which said sun screen agent is capable of being intimately admixed.

5. The method of claim 4, wherein said alkali soluble, polymeric sun screen agent contains up to about 90%, by weight, of moieties derived from at least one comonomer other than those comprising the combination of at least one ethylenically unsaturated ultra-violet absorbing compound and at least one acidic comonomer, said other comonomer being selected from the group consisting of styrene, alpha-methyl styrene, the acrylic and methacrylic acid esters of aliphatic alcohols, the $C_1$–$C_2$ beta-hydroxy alkyl esters of acrylic and methacrylic acids, isoprene, butadiene, acrylamide, acrylonitrile, vinyl formate, vinyl acetate, vinyl chloride, vinylidene chloride, vinyl propionate, dibutyl maleate, dibutyl fumarate, ethylene, propylene and N-vinyl pyrrolidone.

6. The method of claim 4, wherein said alkali soluble, polymeric sun screen agent contains from about 5 to 90%, by weight, of moieties derived from at least one ethylenically unsaturated ultra-violet absorbing compound of (A) and from about 5 to 50%, by weight, of moieties derived from at least one acidic comonomer of (B).

References Cited
UNITED STATES PATENTS

| | | | |
|---|---|---|---|
| 2,276,204 | 3/1942 | Kilgore | 167—90 |
| 2,728,784 | 12/1955 | Bell et al. | |
| 2,974,089 | 3/1961 | Alexander et al. | 167—90 |
| 3,004,896 | 10/1961 | Heller et al. | 167—90 |
| 3,190,860 | 6/1965 | Fertig et al. | |
| 3,190,875 | 6/1965 | Skoultchi et al. | |
| 3,238,138 | 3/1966 | Braunwarth et al. | 167—90 XR |
| 3,244,708 | 4/1966 | Duennenberger et al. | 167—90 XR |
| 3,269,903 | 8/1966 | Fieandt et al. | 167—90 XR |
| 3,339,546 | 9/1967 | Chen. | |
| 3,341,493 | 9/1967 | Goldberg et al. | |
| 3,361,842 | 1/1968 | Applegath et al. | 260—78.5 XR |

ALBERT T. MEYERS, Primary Examiner

D. R. ORE, Assistant Examiner

U.S. Cl. X.R.

424—59, 60, 168